F. G. MERRIAM.
Separators for Salt-Boxes.

No. 149,876. Patented April 21, 1874.

Witnesses.
John Pollitt
Henry Small

Inventor
Flavel G. Merriam
By Wm. E. Simonds
Atty.

UNITED STATES PATENT OFFICE.

FLAVEL G. MERRIAM, OF HARTFORD, CONNECTICUT.

IMPROVEMENT IN SEPARATORS FOR SALT-BOXES.

Specification forming part of Letters Patent No. 149,876, dated April 21, 1874; application filed December 26, 1873.

To all whom it may concern:

Be it known that I, FLAVEL G. MERRIAM, of Hartford, in the county of Hartford and State of Connecticut, have invented an Improved Salt-Separator for use in Salt-Boxes, of which the following is a specification, reference being had to the accompanying sheet of drawings, where—

Figure 1:
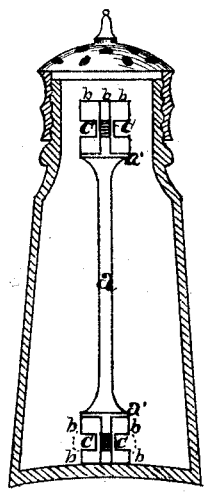
Figure 2:

Figure 1 is a view of a salt-box in central vertical section containing my improved separator. Fig. 2 is an end view of the separator.

When salt is put for table use into a box or bottle having a perforated top through which to sift the salt, the salt is very apt to so stick together as to entirely prevent it from coming out through the perforations. To counteract this clogging and sticking tendency of the salt, a practice has arisen of putting articles of different shapes into the box to roll around and loosen up the salt. Those heretofore used have been constructed with projections upon the end disks, which, being at the peripheries of the disks, form cup-like places in their centers, and these cup-like places are liable, especially at the lowermost end of the device, to become clogged and filled with damp or sticky salt, and thus render the endwise action of the projection—and this is the principal action of the whole device—nugatory.

The object of my invention is to obviate this difficulty; and my invention consists of a rod, $a$, swelling to a circular disk, $a'$ $a'$, toward each end, on which are set teeth $b$ $b$ $b$ $b$, like the teeth of spur-gearing, and, by preference, these teeth are each divided into two parts by the mortises $c$ $c$.

I find by experience that these spur-gear teeth are more unlikely to embed into the salt, and thus prevent the thing from rolling and tumbling, and thus separating the salt, than any form heretofore devised, and from the simple shape of the article I find it cheaper and easier to make than any of the separators heretofore in use.

I claim as my invention—

A salt-separator composed of the rod $a$, swelling to a disk toward each end, and having thereon the square-edged spur-gear teeth $b$, all constructed, arranged, and designed for use substantially as described.

FLAVEL G. MERRIAM.

Witnesses:
 WM. EDGAR SIMONDS,
 S. J. SIMONDS.